(No Model.) 3 Sheets—Sheet 1.

L. & A. CHRONIK.
MAGAZINE CAMERA.

No. 509,611. Patented Nov. 28, 1893.

Witnesses:

Inventors:
Louis Chronik
August Chronik

By their Attorney William B. Greeley (No Model.) 3 Sheets—Sheet 2.

L. & A. CHRONIK.
MAGAZINE CAMERA.

No. 509,611. Patented Nov. 28, 1893.

Witnesses:

Louis Chronik
August Chronik
Inventors:

By their Attorney William B. Greeley (No Model.)  L. & A. CHRONIK.  3 Sheets—Sheet 3.
MAGAZINE CAMERA.
No. 509,611.  Patented Nov. 28, 1893.
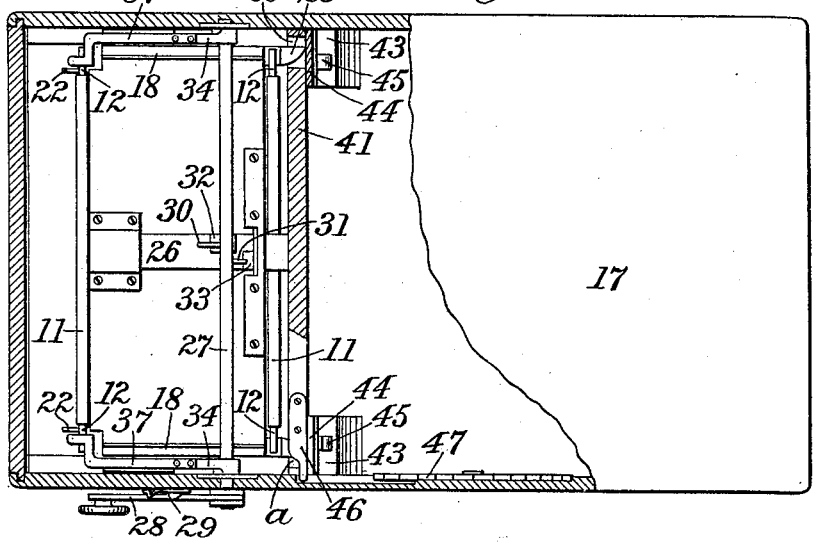
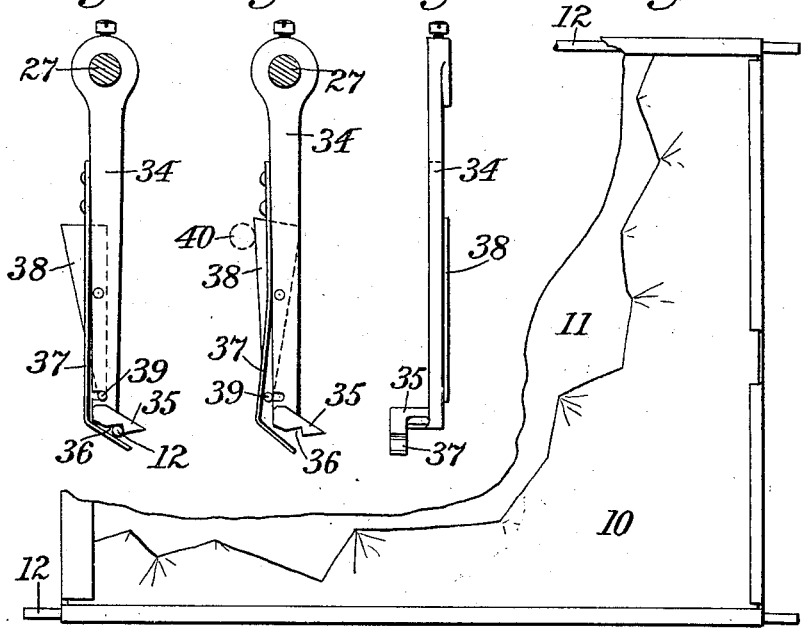

UNITED STATES PATENT OFFICE.

LOUIS CHRONIK, OF BROOKLYN, AND AUGUST CHRONIK, OF NEW YORK, N. Y.

MAGAZINE-CAMERA.

SPECIFICATION forming part of Letters Patent No. 509,611, dated November 28, 1893.

Application filed February 23, 1893. Serial No. 463,296. (No model.)

*To all whom it may concern:*

Be it known that we, LOUIS CHRONIK, of Brooklyn, county of Kings, and AUGUST CHRONIK, of New York, county of New York, State of New York, have invented certain new and useful Improvements in Magazine-Cameras; and we do hereby declare that the following is a full and exact description thereof, reference being had to the accompanying drawings, and to the letters and figures of reference marked thereon, making a part of this specification.

This invention relates generally to photographic cameras which are intended to be loaded with several plates at one time and in which means are provided by which fresh plates can be successively exposed.

The objects of the invention are to provide a magazine camera in which the plates are so held that the camera can be turned up side down without injuring or disturbing the plates at the same time that the plates are free to be shifted to expose one after another.

A further object is to provide improved means whereby the plates can be taken from one end of the magazine and placed in proper position at the other end of the same magazine.

Other objects which are incidental to those named will be referred to more particularly hereinafter.

The invention consists in the various combinations and details of construction hereinafter more particularly described and claimed.

Figure 1:
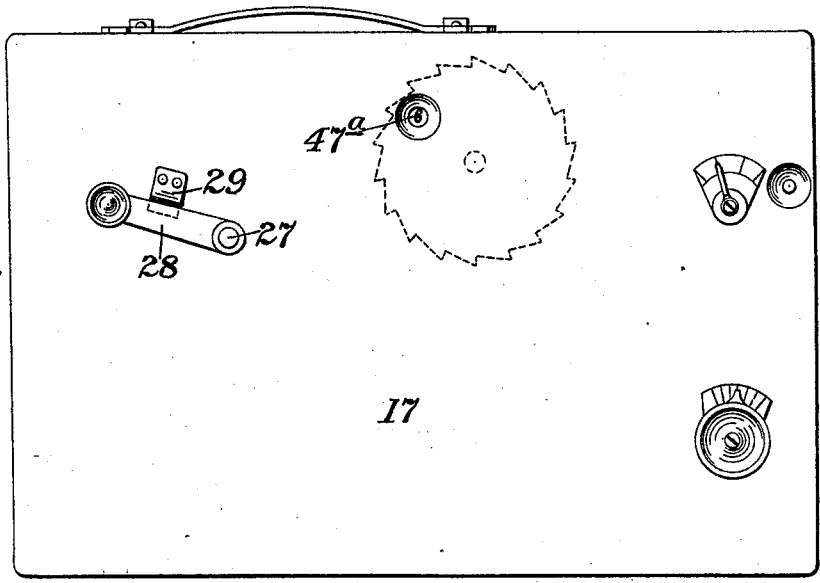
Figure 2:
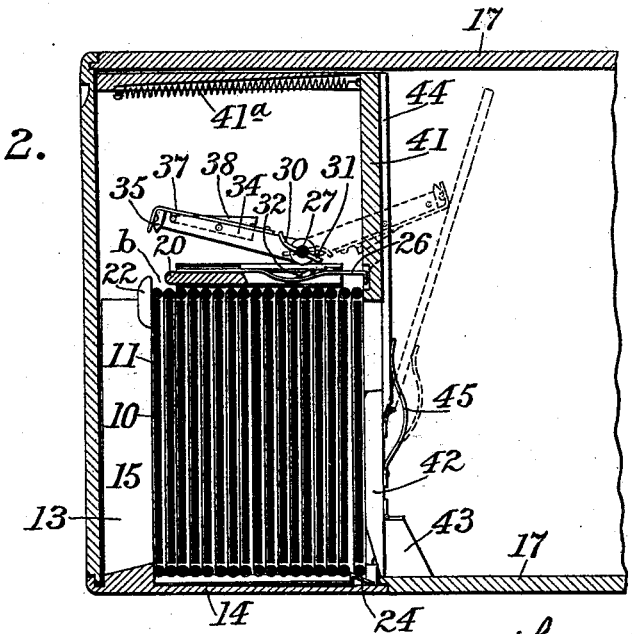
Figure 3:
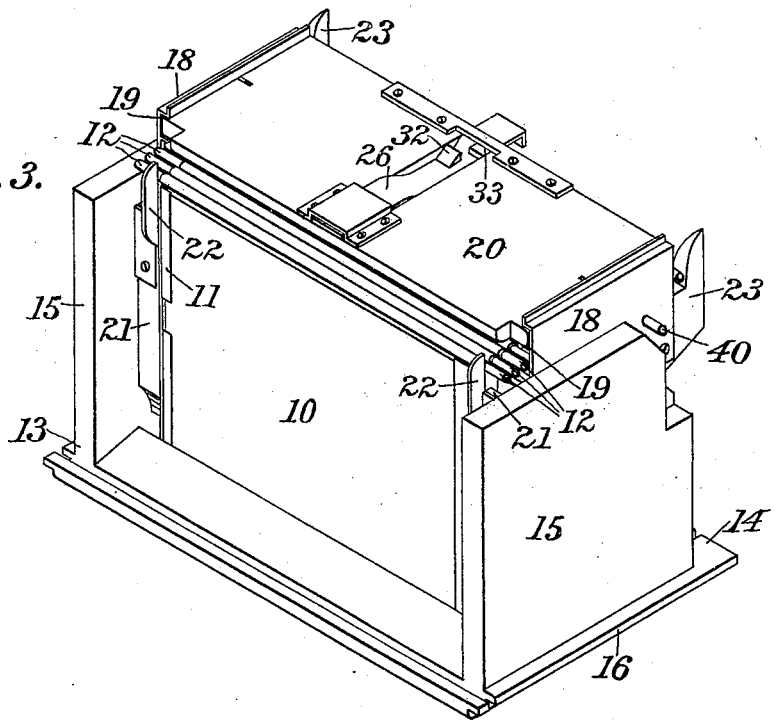
Figure 4:
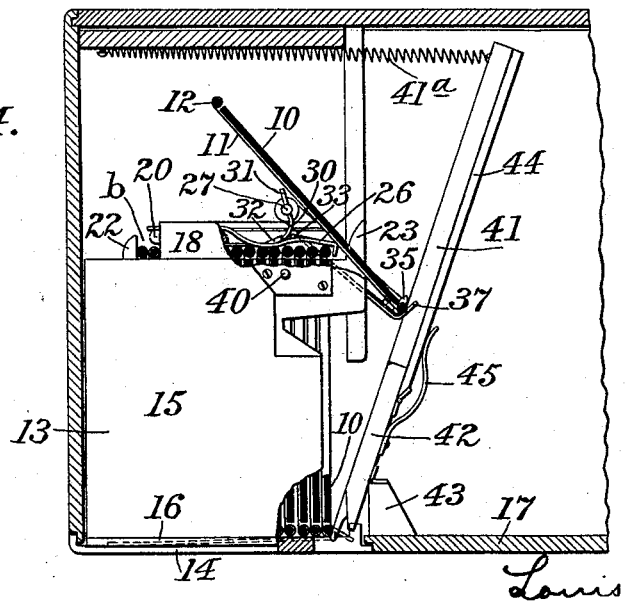

In the drawings: Figure 1 is a side view of a camera equipped with the present improvements. Fig. 2 is a partial longitudinal central section of the same. Fig. 3 is a perspective view of the magazine removed from the camera. Fig. 4 is a partial longitudinal section of the camera on a plane between the end of the magazine and the adjacent wall of the camera, the end of the magazine and the ends of the plate-holders being partly broken out and the parts shown in the positions assumed when a plate is being transferred from the rear to the front end. Fig. 5 is a partial horizontal section of the camera above the magazine. Figs. 6, 7 and 8 are detail views of one of the arms which pick up and transport a plate. Fig. 9 is a broken front view of a plate in its holder.

The successive plates 10, 10, are represented in the drawings, see Figs. 2, 3, 4 and 9, as mounted each in a holder consisting of a thin metal sheet 11 having its margin folded over to grasp the plate 10, with rods 12, 12, included in the folded margin of the sheet 11 at the top and bottom of the plate, the ends of the rods projecting beyond the ends of the plate and holder. The form of the holder is such that the plate may be grasped by certain parts of the plate-shifting mechanism, and be lifted and transported in the manner hereinafter described. The plates are supported by a magazine 13, see particularly Figs. 2 and 3, which is adapted to maintain the plates in position to be grasped by the transporting mechanism at one end of the magazine and to receive each plate from the transporting mechanism at the other end. At the same time it is adapted to hold the plates in such a manner that no plate can be accidentally misplaced even if the camera be overturned. For convenience in unloading and reloading, the magazine is made removable from the camera. The frame of the magazine is composed of a bottom piece 14 and two side pieces 15, the bottom piece 14 being formed with a bead 16 at each end to enter a corresponding groove in the side of the camera box 17. The sides 15 of the frame are far enough apart to permit the plates with their holders to move freely between them and each side piece is extended above the plates, as they stand in the magazine, preferably by a plate 18 which is formed with a groove 19 to receive the ends of a removable cover or top 20. To the inner faces of the side pieces 15, near the end from which the plates are removed, are fixed stops 21 to limit the movement of the plates bodily in that direction. Each stop 21 may be provided with a finger 22 which supports the upper rod 12 of each plate-holder while it is being grasped by the transporting mechanism. The top or cover 20 overlies all of the plates in the magazine except the last one of the number, a space being left, as shown at *b* in Fig. 4, through which the plate which is at the end of the series may be withdrawn. The sides 15 are also provided, at that end of the magazine which receives each plate in succession, with guide fingers 23 to receive the projecting ends of one of the rods 12 of the plate-holder. The bottom 14 of the magazine is recessed, as indicated in Fig. 2, to receive a spring-hook or tongue 24 which is adapted to engage the lower edge of the last plate or holder which has been inserted at the forward end of the magazine, and thereby to hold all of the plates, at the bottom, from shifting forward. The top or cover 20 is also recessed to receive a sliding spring-tongue or hook 26, as shown in Figs. 2, 3, 4 and 5, which is adapted to engage the upper edge of the last plate inserted and to be moved, by means hereinafter described, to thrust all the plates, at the top, backward from the front end to the rear end of the magazine.

The parts described above are all appurtenances of the magazine itself and are withdrawn with the magazine whenever it is removed from the camera. The devices which co-operate with the magazine and its parts, to provide for the transportation of the plates in succession from one end of the magazine to the other will now be described. In the sides of the camera, slightly above the level of the magazine, is journaled a shaft 27, see Figs. 1, 2, 4 and 5, which is provided with a suitable crank or handle 28 by which it may be oscillated. A suitable latch 29 may be fixed to the side of the camera to retain the handle in the position shown in Fig. 1 and with it the parts which are carried by the shaft. To the shaft 27, in line with the spring-tongue 26, are fixed a long pin 30 and a short pin 31, the said pins being set in different planes, and adapted to engage with oppositely disposed lugs 32 and 33 which are fixed to the upper surface of the spring-tongue 26. As the shaft 27 is oscillated from the position represented in Fig. 1, the long finger 30 engages the lug 32 and thrusts the tongue 26 backward at the same time depressing it to engage the upper edge of the last plate which has been inserted in the magazine, thereby crowding all the plates toward the rear end of the magazine and leaving the front end free for another plate. On the return movement of the shaft 27, just before it comes to the position of rest, indicated by the position of the handle in Fig. 1, the short finger 31 engages the lug 33 and thrusts the spring-tongue forward again but without depressing it. The shaft 27 also has fixed to it near its ends, two arms 34, 34, which are adapted to engage the plate at the rear of the magazine, to lift it out and transport it, and to release it at the other end of the magazine. These arms may be variously formed to engage the plates but the construction represented in the drawings has been found to be reliable in use. As represented, each arm has a fixed jaw 35 which is notched, as at 36, to receive the projecting end of the rod 12 of the plate-holder. To the upper side of the arm is fixed a spring-jaw 37 which is itself bent down over the fixed jaw 35 so that as the arm is turned down upon the plate the springs 37 will yield and permit the ends of the rod 12 to pass into the notches 36. The plate having been engaged by the arms, in the manner described, it will be lifted out through the space $b$ between the top or cover 20 and the finger 22 and carried through the top of the magazine, in the manner represented in Fig. 4, being turned completely over. In order to provide for the release of the plate from the arms at the proper time, a lever 38 is pivoted to the side of each arm 34 and carries a pin 39 which is adapted to raise the spring 37 and to release the rod 12 from the notches 36 in the jaw 35. Each lever 38 is so formed that when the arms are in a proper position to release the plate carried by them each lever will strike a corresponding fixed pin 40, which may be carried by the magazine, as shown in Figs. 3 and 4, and, by the continued movement of the arms with the shaft, will be caused to raise the spring 37, as shown in Fig. 7.

In order that the light may be effectually excluded from that portion of the camera in which the magazine is placed and that too much space may not be taken up in the camera a door 41 is provided which closes the space between the top of the magazine and the top of the camera and which at the same time assists in thrusting the plates back toward the rear end of the magazine and guides into position each plate as it is brought to the front end of the magazine. The door is carried by two bars 42 which extend down at each side of the magazine, leaving the plate entirely unobstructed, and are hinged near but above their lower ends to fixed blocks 43. For a purpose presently to be described, the door is slotted or cut away near the sides of the camera and in line with the arms 34, as indicated at $a$ in Fig. 5, and such slot or opening is covered by a leaf 44 which is hinged to the bar 42, so that it may open toward the front of the camera and is normally held in position to close the opening by a light spring 45. As each plate is brought over from the rear end of the magazine by the arms 34 the forward edge of the plate or holder strikes the door 41 and thrusts it forward, as shown in Fig. 4. At the same time the ends of the bars 42, below their fulcra, come in contact with the last plate which has been inserted in the magazine and thrust all of the plates backward until the edge of the last one is engaged by the spring-tongue 24 by which the plates are held in position. When the plate and holder are released by the arm 34 the projecting ends of the rod 12 which has then become the lowermost, rest against the bars 42 and the plate is thereby guided into position at the bottom, while as the door 41 is thrown back by its spring $41^a$, the plate is also brought to a vertical position so that its upper edge may be grasped subsequently by the spring-tongue 26 as described above. As the shaft is returned to its initial position after releasing a plate, it is not necessary that the whole door 41 should again be swung back and therefore the openings $a, a,$ are provided for the passage of the arms 34, the leaves 44 yielding, as indicated by dotted lines in Fig. 2.

As it is desirable to provide an indicator to show how many plates have been exposed and thereby to prevent a second exposure of any plate, the door 41, being swung forward only when a plate is shifted from one end to the other of the magazine, is made to actuate an indicator which may be of any desired construction.

As represented in Figs 1 and 5, the indicator consists of a toothed-wheel 47 which is mounted upon the side of the camera and is adapted to be advanced through the angular distance of each tooth from the next by a finger 46 which is fixed to the door 41 and is adapted to engage the teeth of the wheel 45 in succession. Upon the side of the wheel are formed the successive figures, corresponding in position to the teeth of the wheel and exposed to view, one at a time, through a sight opening $47^a$ in the side of the camera.

The operation of our improved devices will now be readily understood. When the handle 28 is in the position represented in Fig. 1 and is engaged by the latch 29, the arms 34 are then in engagement with the last plate in the magazine, and, as the arms are then held from movement, and as no other plate can be removed, by reason of the top or cover 20 overlying all the others, all of the plates are then held securely locked in the magazine so that they cannot shift, if the camera be turned up side down. When the handle 28 is released and is thrown over toward the right, the plate which is held by the arms is first withdrawn, thereby leaving an empty space at the rear of the magazine. At this time, while the plate is being carried over the top of the magazine, the long finger 30 first strikes and depresses the spring-tongue 26 to engage the upper edge of the last plate inserted at the front end of the magazine and then by its engagement with the lug 32 thrusts the spring-tongue back, thereby pressing the tops of all the plates in the magazine toward the rear in readiness for the reception at the front end of the plate which is to be deposited there. As the movement of the shaft and arms is continued the plate strikes the door 41 and moves the lower ends of the bars 42 backward against the last plate inserted, thereby thrusting all the plates backward at the bottom until the last one is engaged by the spring-tongue 24. At the same time the finger 46 advances the wheel 47 through one space and shows that another plate has been shifted. When the plate has been released from the arms, in the manner previously described, and has dropped into place, the shaft and arms are moved backward to their original position. During this movement the finger 30 moves from the spring-tongue 26 and permits it to rise and then the short finger 31 engages the lug 33 and thrusts the tongue forward in readiness to be depressed again on the next movement. As soon as the plate has been deposited the door 41 is returned to its vertical position by its spring $41^a$, and, as already described, the leaves 44 yield to permit the passage of the arms 34 back toward their original position.

It will be understood that in the drawings the plates in the magazine are shown in the position in which they stand after exposure, that is, with the film side toward the lens. In Fig. 2 the plate-shifting devices are shown in the position they assume when about to lift a plate whether it be turned one way or the other, while in Fig. 4 the plate which is represented in the grasp of the shifting devices is in the proper position to bring its film side toward the lens to be exposed, and of course, must have been placed in the magazine before exposure with its film side away from the lens. It will be obvious that an operation of the plate-shifting devices after all the plates have been exposed will bring a previously exposed plate with its back to the lens and a second exposure of the same film will thereby be prevented.

We claim as our invention—

1. A magazine for photographic plates comprising a bottom, top and end pieces, stops for the plates at one end of the magazine, and a sliding spring tongue carried by the top and adapted to be depressed to engage the edge of the last plate inserted at the other end of the magazine and to be moved back to draw the plates toward the stops, substantially as shown and described.

2. The combination with a camera, of a magazine to receive a number of plates and provided at one end with stops for the plates, mechanism to withdraw the plates in succession from the said end and to deposit them at the other end, and bars moved by the plate in its passage to crowd the plates in the magazine back toward the stops, substantially as shown and described.

3. The combination with a camera, of a magazine to receive a number of plates, arms mounted upon a common axis and adapted to engage the last one of said plates, mechanism to swing said arms upon the axis to withdraw the said plate from one end of the magazine and to transport it to the other, a door to close the space above the magazine and held in position by a spring whereby it may yield when it is struck by the plate in its movement and may again swing back into place, substantially as shown and described.

4. The combination with a camera, of a magazine to receive a number of plates, arms mounted upon a common axis and adapted to engage the last one of said plates, mechanism to swing said arms upon the axis to withdraw the said plate from one end of the magazine and to transport it to the other, a door swinging upon a horizontal axis and held by a spring to close the space above the magizine and to yield when struck by the plate in its movement, the door being cut away in line with said arms, and leaves hinged upon said door and spring-pressed to close the openings and to yield to permit the passage of the arms without the plate, substantially as shown and described.

5. The combination with a camera, of a magazine to hold a number of plates, mechanism to withdraw the last one of the plates from one end of the magazine to the other, and a door swinging upon a horizontal axis to close the space above the magazine and to yield when struck by the plate in its movement, said door being supported by bars hinged above their ends to fixed blocks, whereby as the door is pushed forward by the plate the ends of said arms are pressed against the plates in the magazine to thrust them to the rear, substantially as shown and described.

6. The combination with a camera, of a magazine to receive a number of plates, a shaft mounted in bearings above the magazine, arms carried by said shaft and adapted to engage the last one of said plates, and an arm by which said shaft may be oscillated to withdraw the plate and transport it to the other end of the magazine, substantially as shown and described.

7. The combination with a camera, of a magazine to receive a number of plates, a shaft mounted in bearings above the magazine, arms carried by said shaft and adapted to engage the last one of the plates, an arm by which said shaft may be oscillated to withdraw the plate, and a latch to prevent the movement of said shaft, substantially as shown and described.

8. The combination with a camera, of a magazine to receive a number of plates, a shaft mounted above said magazine, mechanism actuated by said shaft to engage and withdraw the last one of the plates and to transport it to the other end of the magazine, a sliding, spring-tongue supported by said magazine, and fingers carried by said shaft and adapted respectively to depress said tongue to engage the upper edge of the plate in the magazine and slide it rearwardly and to slide the tongue forward, as the shaft is oscillated, substantially as shown and described.

9. The combination with a camera, of a magazine to receive a number of plates, mechanism to withdraw the last plate of the number and transport it to the other end of the magazine, and a swinging door adapted to be moved only by a plate in its movement, and to impart movement to an indicator, substantially as shown and described.

In testimony whereof we have signed our names to this specification in the presence of two subscribing witnesses.

LOUIS CHRONIK.
AUGUST CHRONIK.

Witnesses:
A. N. JESBERA,
A. WIDDER.